(12) United States Patent
Jang et al.

(10) Patent No.: US 12,657,761 B2
(45) Date of Patent: Jun. 16, 2026

(54) IMAGE SIGNAL PROCESSOR AND METHOD FOR PROCESSING IMAGE SIGNAL

(71) Applicant: SK hynix Inc., Icheon-si (KR)

(72) Inventors: Cheol Jon Jang, Icheon-si (KR); Dong Ik Kim, Icheon-si (KR); Jun Hyeok Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 350 days.

(21) Appl. No.: 18/475,996

(22) Filed: Sep. 27, 2023

(65) Prior Publication Data

US 2024/0320852 A1 Sep. 26, 2024

(30) Foreign Application Priority Data

Mar. 23, 2023 (KR) ........................ 10-2023-0038199

(51) Int. Cl.
| | |
|---|---|
| *G06T 5/00* | (2024.01) |
| *G06T 5/70* | (2024.01) |
| *G06T 7/73* | (2017.01) |
| *H04N 23/84* | (2023.01) |
| *H04N 25/60* | (2023.01) |
| *H04N 25/68* | (2023.01) |

(52) U.S. Cl.
CPC ................. *G06T 7/73* (2017.01); *G06T 5/00* (2013.01); *G06T 2207/10024* (2013.01)

(58) Field of Classification Search
CPC ... G06T 7/73; G06T 5/00; G06T 2207/10024; G06T 2207/20012; G06T 5/20; G06T 5/70; H04N 23/84; H04N 25/60; H04N 25/68; H04N 25/704
See application file for complete search history.

(56) References Cited

U.S. PATENT DOCUMENTS

| | | | |
|---|---|---|---|
| 10,984,504 B2 | 4/2021 | Oh et al. | |
| 2009/0129674 A1* | 5/2009 | Lin | G06T 7/13 |
| | | | 382/173 |
| 2010/0232697 A1* | 9/2010 | Mishima | G06T 5/20 |
| | | | 382/268 |

(Continued)

FOREIGN PATENT DOCUMENTS

| | | | | |
|---|---|---|---|---|
| EP | 2711894 A2 * | 3/2014 | ............. | G06T 7/194 |
| KR | 1020210148822 A | 12/2021 | | |

*Primary Examiner* — John Villecco
*Assistant Examiner* — Kyla Guan-Ping Tiao Allen
(74) *Attorney, Agent, or Firm* — WILLIAM PARK AND ASSOCIATES LTD.

(57) ABSTRACT

An image signal processor for processing image signals and an image signal processing method for the same are disclosed. The image signal processor includes a directionality determiner configured to determine directionality of a target kernel including a target pixel, based on an angle between directions within the target kernel and a difference in directionality strength between the directions. The image signal processor also includes a pixel corrector configured to correct, when the target kernel has specific directionality according to a result of the directionality determination, the target pixel using pixels arranged in each of a plurality of directions having higher directionality strength than a predetermined directionality strength from among the directions within the target kernel.

18 Claims, 9 Drawing Sheets

(56)  References Cited

U.S. PATENT DOCUMENTS

| 2012/0182452 A1* | 7/2012 | Yasuma | ............... | H04N 1/4097 |
| | | | | 348/246 |
| 2012/0257821 A1* | 10/2012 | Saito | .................... | G06T 3/4015 |
| | | | | 382/162 |
| 2014/0092000 A1* | 4/2014 | Nonaka | ................ | G09G 3/3426 |
| | | | | 345/102 |
| 2019/0394408 A1* | 12/2019 | Tanaka | ................... | H04N 23/84 |
| 2021/0377497 A1* | 12/2021 | Bernstein | ............. | H04N 25/447 |
| 2023/0169629 A1* | 6/2023 | Moon | ....................... | G06T 5/73 |
| | | | | 382/162 |

* cited by examiner

IMAGE SIGNAL PROCESSOR AND METHOD FOR PROCESSING IMAGE SIGNAL

CROSS-REFERENCE TO RELATED APPLICATION

This patent document claims the priority under 35 U.S.C. § 119(a) to, and benefits of, Korean patent application No. 10-2023-0038199, filed on Mar. 23, 2023, in the Korean Intellectual Property Office, which is hereby incorporated by reference in its entirety as part of the disclosure of this patent document.

TECHNICAL FIELD

The technology and implementations disclosed in this patent document generally relate to an image signal processor capable of processing image signals and an image signal processing method for the same.

BACKGROUND

An image sensor is a device for capturing optical images by converting light into electrical signals using a photosensitive semiconductor material. With the development of automotive, medical, computer, and communication industries, the demand for high-performance image sensing devices is increasing in various devices such as smart phones, digital cameras, game machines, IoT (Internet of Things), robots, security cameras, and medical micro cameras.

A pixel array that directly captures an optical image in an image sensing device may include defective pixels that cannot normally acquire a color image due to process errors. To implement an autofocus function, the demand for image sensing devices manufactured such that a pixel array includes phase difference detection pixel(s) is gradually increasing. The phase difference detection pixels capable of acquiring phase-difference related information cannot acquire color images in the same manner as defective pixels, such that the phase difference detection pixels can be treated as defective pixels from the point of view of color images.

As a process for the pixel array is advanced and the autofocus function becomes more important, the ratio of defective pixels or phase difference detection pixels included in the pixel array is increasing, and the accuracy of correction for the detective pixels or the phase difference detection pixels is being highlighted as an important factor in determining the quality of images.

To improve the quality of image signal processing, it is necessary to correct these defective pixels. When correcting the defective pixels, the directionality of a kernel including the defective pixels may be considered. At this time, in a situation where it is difficult to clearly recognize the directionality of the corresponding kernel, if signals are erroneously corrected without considering such directionality, the quality of images may be deteriorated.

SUMMARY

Various embodiments of the disclosed technology relate to an image signal processor capable of correcting defective pixels in a situation where a target kernel including the defective pixels has unclear directionality, and an image signal processing method for the same.

In accordance with an embodiment of the disclosed technology, an image signal processor may include a directionality determiner configured to determine directionality of a target kernel including a target pixel, based on an angle between directions within the target kernel and a difference in directionality strength between the directions; and a pixel corrector configured to correct, when the target kernel has specific directionality according to a result of the directionality determination, the target pixel using pixels arranged in each of a plurality of directions having higher directionality strength than a predetermined directionality strength from among the directions within the target kernel.

In accordance with another embodiment of the disclosed technology, an image signal processor may include: a directionality determiner configured to determine directionality of a target kernel including a target pixel; and a pixel corrector configured to correct, when the target kernel has specific directionality according to a result of the directionality determination, the target pixel based on a plurality of directions having higher directionality strength than a predetermined directionality strength from among directions within the target kernel.

In accordance with another embodiment of the disclosed technology, an image signal processing method may include: determining directionality of a target kernel including a target pixel; and correcting, when the target kernel has specific directionality according to a result of the directionality determination, the target pixel based on a plurality of directions having higher directionality strength than a predetermined directionality strength from among directions within the target kernel.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
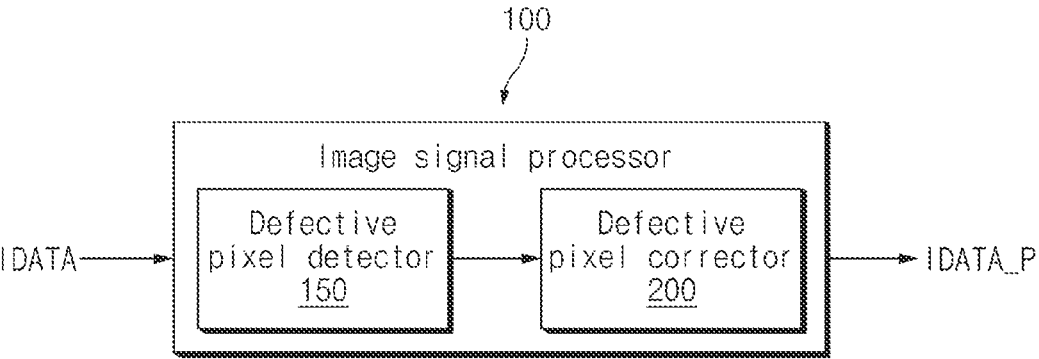
FIG. 1 is a block diagram illustrating an example of an image signal processor based on some implementations of the disclosed technology.

This patent document provides implementations and examples of an image signal processor capable of processing image signals and an image signal processing method for the same that may be used in configurations to substantially address one or more technical or engineering issues and to mitigate limitations or disadvantages encountered in some other image signal processors. Some implementations of the disclosed technology relate to an image signal processor capable of correcting defective pixels in a situation where a target kernel including the defective pixels has unclear directionality. In recognition of the issues above, even when a kernel including defective pixel(s) has unclear directionality, the image signal processor based on some implementations of the disclosed technology can increase the accuracy of correction by correcting the defective pixels in consideration of the directionality of the corresponding kernel, thereby increasing the quality of image signal processing. In addition, the image signal processor based on some implementations of the disclosed technology can define a condition in which the directionality of the kernel including the defective pixels is clear, and can thus prevent or mitigate unnecessary calculation (or unnecessary operation) from being continuously performed to determine the directionality of the target kernel in a situation where the directionality of the kernel is unclear.

Reference will now be made in detail to some embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

FIG. 1 is a block diagram illustrating an example of an image signal processor 100 based on some implementations of the disclosed technology.

Referring to FIG. 1, the image signal processor 100 may perform at least one image signal process on image data (IDATA) to generate the processed image data (IDATA_P). The image signal processor 100 may reduce noise of image data (IDATA), and may perform various kinds of image signal processing (e.g., demosaicing, defect pixel correction, gamma correction, color filter array interpolation, color matrix, color correction, color enhancement, lens distortion correction, etc.) for image-quality improvement of the image data.

In addition, the image signal processor 100 may compress image data that has been created by execution of image signal processing for image-quality improvement, such that the image signal processor 100 can create an image file using the compressed image data. Alternatively, the image signal processor 100 may recover image data from the image file. In this case, the scheme for compressing such image data may be a reversible format or an irreversible format. As a representative example of such compression format, in the case of using a still image, Joint Photographic Experts Group (JPEG) format, JPEG 2000 format, or the like can be used. In addition, in the case of using moving images, a plurality of frames can be compressed according to Moving Picture Experts Group (MPEG) standards such that moving image files can be created.

The image data (IDATA) may be generated by an image sensing device that captures an optical image of a scene, but the scope of the disclosed technology is not limited thereto. The image sensing device may include a pixel array including a plurality of pixels configured to sense incident light received from a scene, a control circuit configured to control the pixel array, and a readout circuit configured to output digital image data (IDATA) by converting an analog pixel signal received from the pixel array into the digital image data (IDATA). In some implementations of the disclosed technology, it is assumed that the image data (IDATA) is generated by the image sensing device.

The pixel array of the image sensing device may include defective pixels that cannot normally capture a color image due to process limitations or temporary noise inflow. In addition, the pixel array may include phase difference detection pixels configured to acquire phase difference-related information to implement the autofocus function. The phase difference detection pixels cannot acquire color images in the same manner as defective pixels, such that the phase difference detection pixels can be treated as defective pixels from the point of view of color images. In some implementations, for convenience of description and better understanding of the disclosed technology, the defective pixel and the phase difference detection pixel, each of which cannot normally acquire the color image, will hereinafter be collectively referred to as "defective pixels".

To increase the quality of color images, it is essential to improve the accuracy of correction of defective pixels. To this end, the image signal processor 100 based on some implementations of the disclosed technology may include a defective pixel detector 150 and a defective pixel corrector 200.

The defective pixel detector 150 may detect pixel data of the defective pixel from the image data (IDATA). In some implementations of the disclosed technology, for convenience of description, digital data corresponding to a pixel signal of each pixel will hereinafter be defined as pixel data, and a set of pixel data corresponding to a predetermined unit (e.g., a frame or kernel) will hereinafter be defined as image data (IDATA). Here, the frame may correspond to the entire pixel array, and the kernel may refer to a unit for image signal processing. In addition, the actual value of corresponding pixel data may be abbreviated as a "pixel value".

In some implementations, the defective pixel detector 150 may detect pixel data of the defective pixel based on the image data (IDATA). For example, the defective pixel detector 150 may calculate a difference between pixel data of a target pixel (to be used as a target for determining whether or not the corresponding pixel is a defective pixel) and an average value of pixel data belonging to a kernel, and may determine whether the target pixel is a defective pixel based on the calculated difference. That is, the defective pixel detector 150 may determine that the target pixel is a defective pixel having no normal pixel data when a difference between the pixel data of the target pixel and the average value of pixel data belonging to the kernel is equal to or greater than a predetermined threshold value.

In some other implementations, the defective pixel detector 150 may receive pre-stored position information of defective pixels from the image sensing device that generates image data (IDATA), and may determine whether the target pixel is a defective pixel based on the position information of the defective pixels. The image sensing device may store position information of fixed defective pixels due to fabrication process reasons in an internal storage (e.g., one time programmable (OTP) memory), and may provide the position information of the defective pixels to the image signal processor 100.

When the target pixel is determined to be a defective pixel by the defective pixel detector 150, the defective pixel corrector 200 may correct pixel data of the target pixel based on image data of a kernel including the target pixel.

Because the embodiments of the disclosed technology can be applied to the case where the target pixel is a defective pixel, it is assumed that the target pixel corresponds to a defective pixel, and the expression "defective pixel" will hereinafter be referred to as a "target pixel" for convenience of description. In addition, a kernel including a target pixel will hereinafter be referred to as a "target kernel". Although the target pixel is generally located at the center of the target kernel and serves as a center pixel, in some cases, the target pixel may also be included in the vicinity of the target kernel.

In addition, a (5×5)-sized kernel having 25 pixels arranged in a (5×5) array and arranged in a Bayer pattern will hereinafter be described as an example. The Bayer pattern may be a color arrangement pattern of a color filter array (CFA) arranged similarly to human eyes. The human eyes can distinguish green better than red and blue. To reflect characteristics of such human eyes, ¼ of pixels included in one image sensor in the Bayer pattern may sense red components, another ¼ of the pixels included in one image sensor in the Bayer pattern may sense blue components, and the remaining ½ of the pixels included in one image sensor in the Bayer pattern may measure green components. Although the embodiment of the disclosed technology has disclosed that the image is a (5×5)-sized kernel for convenience of description, the technical idea of the disclosed technology can also be applied to another kernel in which color pixels are arranged in other patterns such as a quad-Bayer pattern, a nona-Bayer pattern, a hexa-Bayer pattern, an RGBW pattern, a mono pattern, etc., and the types of image patterns are not limited thereto and can also be sufficiently changed as needed. In addition, a kernel having another size (e.g., a (10×10) size) other than the (5×5) size may be used depending on performance of the image signal processor 100, required correction accuracy, an arrangement method of color pixels, and the like.

Figure 2:
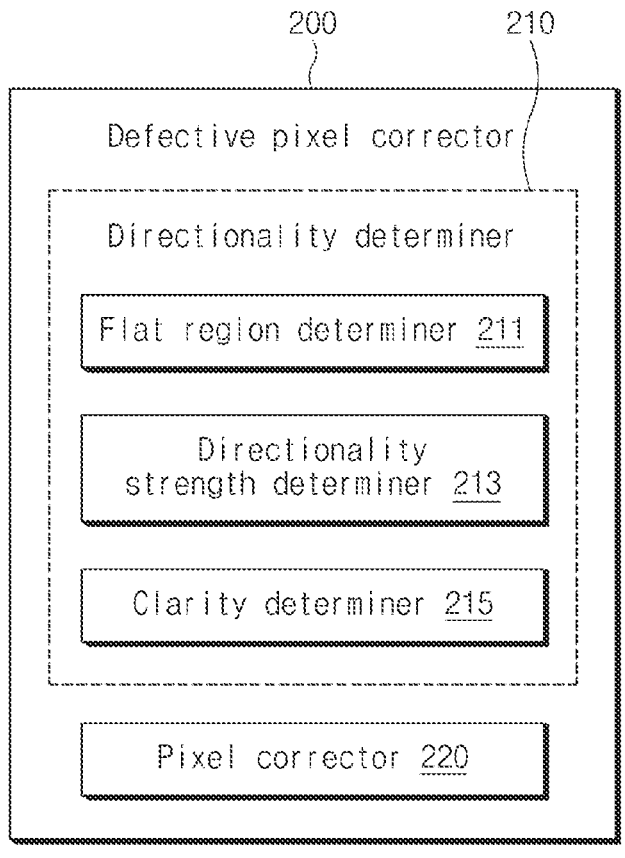
FIG. 2 is a block diagram illustrating an example of a defective pixel corrector shown in FIG. 1 based on some implementations of the disclosed technology.

FIG. 2 is a block diagram illustrating an example of the defective pixel corrector 200 shown in FIG. 1 based on some implementations of the disclosed technology.

Referring to FIG. 2, the defective pixel corrector 200 may include a directionality determiner 210 and a pixel corrector 220.

In some implementations, the directionality determiner 210 may determine directionality of a target kernel based on an angle between directions within the target kernel and a difference in directionality strength between the directions within the target kernel. Here, the directions within the target kernel may include a horizontal direction, a vertical direction, a slash ('/') direction, and a backslash ('\') direction with respect to the target pixel. The slash ('/') direction is a diagonal direction having positive slope. The backslash ('\') direction is a diagonal direction having negative slope. To perform the above-described operation, the directionality determiner 210 may include a directionality strength determiner 213 and a clarity determiner 215.

In some other implementations, the directionality determiner 210 may determine whether the target kernel is a flat region. If it is determined that the target kernel is not the flat region, the directionality determiner 210 may determine the directionality of the target kernel based on an angle between directions within the target kernel and a difference in directionality strength between the directions within the target kernel. To this end, the directionality determiner 210 may further include a flat region determiner 211. FIG. 2 illustrates that the directionality determiner 210 includes a flat region determiner 211. Meanwhile, the configuration of the directionality determiner 210 may not be limited to the attached drawings. For example, when an operation step for determining the directionality of the target kernel is added, the directionality determiner 210 may further include components for the added operation step.

The flat region determiner 211 may determine whether a target kernel centered on a target pixel determined to be a defective pixel by the defective pixel detector 150 corresponds to a flat region. For example, (1) when a dynamic range (DR) of the corresponding target kernel is less than a DR threshold, and (2) when a standard deviation (SD) of pixels (i.e., homogeneous pixels) having the same color within the target kernel is less than a standard deviation (SD) threshold, the corresponding target kernel may be determined to be a flat region. Here, the dynamic range (DR) may be defined as the ratio of a difference between a pixel value of the brightest pixel and a pixel value of the darkest pixel within the corresponding pixel region. If the target kernel is a flat region, this means that values of pixels in the target kernel are flat such that a difference between pixel values of the pixels in the target kernel is not large. Therefore, if it is determined that the target kernel is a flat region, the target pixel can be corrected without considering the directionality of the target kernel.

In some implementations, the directionality strength determiner 213 may determine directionality strength for each direction within the target kernel. In some other implementations, when the directionality determiner 210 includes the flat region determiner 211 and the target kernel does not correspond to the flat region, the directionality strength determiner 213 may determine the directionality strength for each direction within the target kernel. The directionality strength may be determined by calculating a gradient sum in the corresponding direction. That is, the directionality strength determiner 213 may calculate a gradient sum for each direction in the target kernel, and may determine that the directional strength gradually increases in the corresponding direction as the calculated gradient sum decreases. Here, the gradient sum may be a sum of differences between pixel values of pixels for each pixel pair arranged in a corresponding direction. An example of calculating the gradient sum will be described later in more detail with reference to FIGS. 6 and 7.

The clarity determiner 215 may determine whether the directionality of the target kernel is unclear (ambiguous) based on the accuracy determination condition according to the embodiment of the disclosed technology. The ambiguity condition according to one embodiment may indicate that an angle between a plurality of directions having high directionality strength from among all directions in the target kernel is a preset angle (e.g., 45 degrees) or an angle within a preset range (e.g., 40~50 degrees), and may also indicate that a difference in directionality strength between the plurality of directions is less than a threshold. That is, when the corresponding target kernel satisfies the ambiguity condition, the clarity determiner 215 may determine that the directionality of the target kernel is unclear (ambiguous or inaccurate). The number of the above-mentioned directions having high directionality strength and the above-mentioned preset angle or threshold may be changed according to the size of the target kernel and/or the number of directions within the target kernel.

In some implementations, if the size of the target kernel is (5×5) pixels, the directions in the target kernel may include horizontal, vertical, slash, and backslash directions. In this case, the number of the plurality of directions may be set to '2' and the preset angle may be 45 degrees.

In some other implementations, if the size of the target kernel is (7×7) pixels or (10×10) pixels, etc., the directions in the target kernel may include not only additional directions (e.g., 30-degree direction, 150-degree direction, etc.), but also four directions (horizontal, vertical, slash, and backslash directions). In this case, the number of the plurality of directions may be set to three or more instead of two, and the preset angle may be less than 45 degrees. For example, three directions having high directionality strength in the target kernel having an (N×N) size may be determined. If an angle between the directions is 30 degrees and a difference in directionality strength between the directions is less than a threshold, the clarity determiner 215 may determine that the directionality of the corresponding target kernel is unclear (ambiguous).

In addition, the aforementioned preset angle may be a value within a certain range rather than a fixed value. For example, the preset angle may be set to an angle between 40 degrees and 50 degrees instead of a fixed value of 45 degrees.

In some implementations, if it is determined that the directionality is clear based on the determination result of the directionality determiner 210, the pixel corrector 220 may correct the target pixel based on the directionality determined to be clear. For example, if the directionality of the target kernel is determined to be in the vertical direction, the target pixel may be corrected using values of pixels located in the vertical direction. On the other hand, if the directionality of the target kernel is unclear, that is, if the directionality is unclear (ambiguous), multi-direction correction according to an embodiment of the disclosed technology can be performed.

Here, the expression "multi-direction correction" may be defined as an operation of correcting the target pixel based on a plurality of directions satisfying the ambiguity condition. Therefore, in multi-direction correction, the number of directions to be considered for target pixel correction may vary depending on the size of the target kernel and/or the number of directions in the target kernel. For example, if the size of the target kernel is (5×5) pixels, directions within the target kernel may include horizontal, vertical, slash, and backslash directions. In this case, the number of multi-directions may be set to 2. As another example, when the size of the target kernel is (7×7) pixels or (10×10) pixels, the target pixel may be corrected using pixels arranged in N (where N≥3) or more directions having high directionality strength.

Hereinafter, it is assumed that the target kernel is used as a (5×5)-sized kernel and the number of multi-directions is set to 2 for convenience of description. This method will hereinafter be referred to as "dual-direction correction" in the sense that target pixels are corrected in consideration of two directions.

That is, the expression "dual-direction correction" may be defined as an operation of correcting a target pixel using pixels arranged in each of two directions having high directionality strength from among directions within the target kernel.

Meanwhile, according to another embodiment of the disclosed technology, if the directionality determiner 210 includes the flat region determiner 211, the pixel corrector 220 may correct a target pixel included in the target kernel determined to be the flat region or a target pixel included in the target kernel that has clear directionality while not serving as the flat region. For example, as a result of determining the directionality, if the directionality of the target kernel is clear in the horizontal direction, the target pixel may be corrected using pixels arranged in the horizontal direction.

Figure 3:
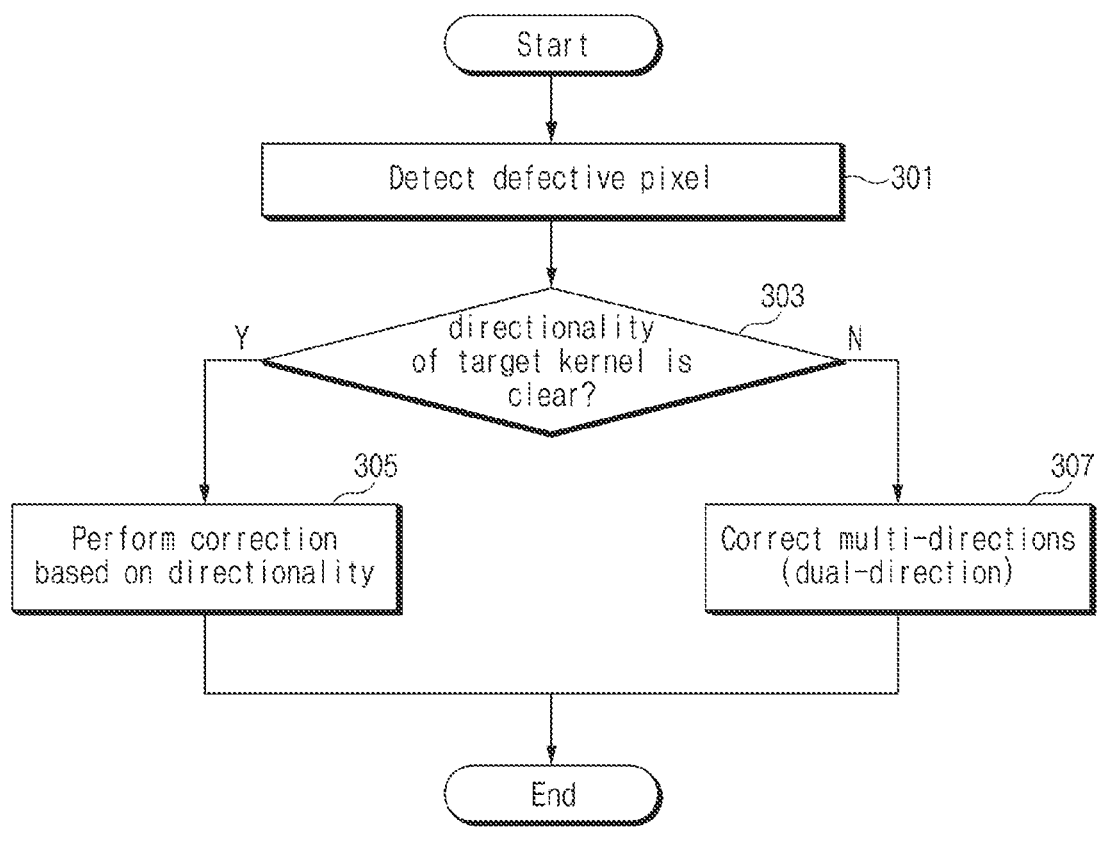
FIG. 3 is a flowchart illustrating an example of an image signal processing method based on some implementations of the disclosed technology.

FIG. 3 is a flowchart illustrating an example of an image signal processing method based on some implementations of the disclosed technology.

Referring to FIG. 3, the defective pixel detector 150 may detect pixel data of a defective pixel from image data IDATA (Operation 301). The directionality determiner 210 may determine whether the directionality of the target kernel is clear or unclear (ambiguous) based on an angle between directions in the target kernel and a difference in directionality strength between directions (Operation 303). As a result of the determination in operation 303, if the directionality of the target kernel is unclear, that is, if the directionality of the target kernel is unclear (ambiguous), the pixel corrector 220 may perform multi-direction correction (e.g., dual-direction correction in case of a (5×5) kernel) according to an embodiment of the disclosed technology (Operation 307).

That is, the pixel corrector 220 may correct the target pixel based on the plurality of directions (e.g., two directions in case of a (5×5) kernel) having high directionality strength from among directions in the target kernel. Specifically, the target pixel may be corrected using pixels arranged in each of the plurality of directions. As a result of the determination in operation 303, if it is determined that the directionality of the target kernel is clear, the pixel corrector 220 may correct the target pixel based on the directionality determined to be clear (Operation 305).

Figure 4:
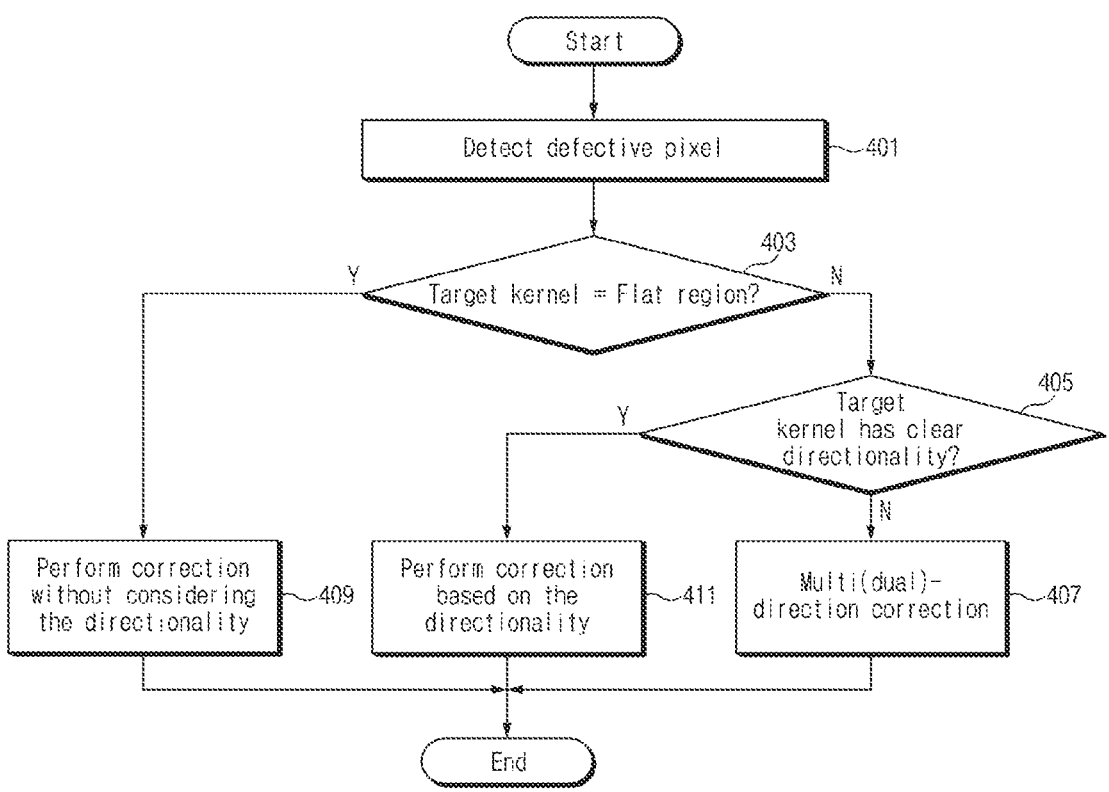
FIG. 4 is a flowchart illustrating an example of an image signal processing method based on some other implementations of the disclosed technology.

FIG. 4 is a flowchart illustrating an example of an image signal processing method based on some other implementations of the disclosed technology.

Referring to FIG. 4, the defective pixel detector 150 may detect pixel data of a defective pixel from image data IDATA (Operation 401). The flat region determiner 211 of the directionality determiner 210 may determine whether the target kernel is a flat region (Operation 403). The fact that the target kernel is a flat region may mean that a difference between pixel values of the corresponding target kernel is not large, such that this means that there is no directionality of the corresponding target kernel. Therefore, if it is determined that the target kernel is a flat region, the pixel corrector 220 may correct the target pixel without considering the directionality (Operation 409). For example, among a target pixel and homogeneous pixels from among all pixels in the target kernel, the pixel corrector 220 may correct the target pixel using a pixel value of a homogeneous pixel located closest to the target pixel. Alternatively, the pixel corrector 220 may correct the target pixel using an average value of four pixels arranged in horizontal and vertical directions from among the target pixel and the homogeneous pixels in the target kernel.

If it is determined that the target kernel is not the flat region, the directionality determiner 210 may determine the directionality of the target kernel based on the angle between directions in the target kernel and a difference in directionality strength between the directions in the target kernel, and may determine whether the directionality of the target kernel is clear or unclear (Operation 405). As a result of the determination in operation 405, if it is determined that the directionality of the target kernel is unclear, i.e., if it is determined that the directionality of the target kernel is ambiguous, the pixel corrector 220 may perform multi-direction correction (e.g., dual-direction correction in case of a (5×5) kernel) (Operation 407). Specifically, the pixel corrector 220 may correct the target pixel based on a plurality of directions (e.g., two directions in case of a (5×5) kernel) having high directionality strength from among directions in the target kernel. As a result of the determination in operation 405, if it is determined that the directionality of the target kernel is clear, the pixel corrector 220 may correct the target pixel based on the directionality (Operation 411).

Figure 5:
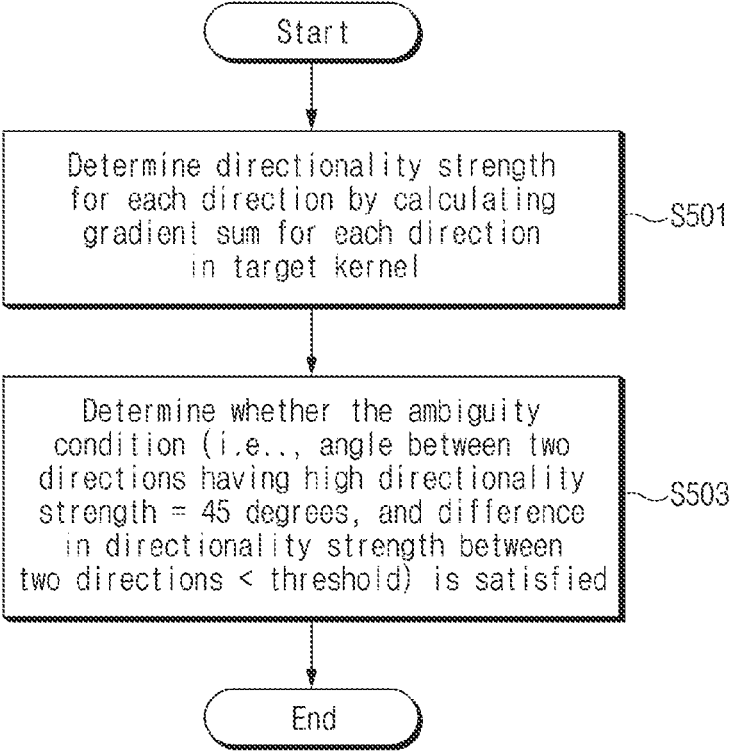
FIG. 5 is a flowchart illustrating an example of a method for determining ambiguity of directionality of a target kernel described in FIGS. 3 and 4 based on some implementations of the disclosed technology.

FIG. 5 is a flowchart illustrating an example of a method for determining ambiguity of directionality of the target kernel described in FIGS. 3 and 4 based on some implementations of the disclosed technology.

First, the directionality strength determiner 213 may determine the directionality strength for each direction by calculating a gradient sum for each direction in the target kernel (Operation 501). As the calculated gradient sum decreases, the directionality strength determiner 213 may determine that the directionality strength increases in the corresponding direction.

The clarity determiner 215 may determine whether the corresponding target kernel satisfies the ambiguity condition (Operation 503). As described above, the ambiguity condition may indicate that an angle between two directions having high directionality strength from among directions within the target kernel is a preset angle (e.g., 45 degrees) or an angle within a preset range, and may also indicate that a difference in directionality strength between the two directions is less than a threshold.

Figure 6:
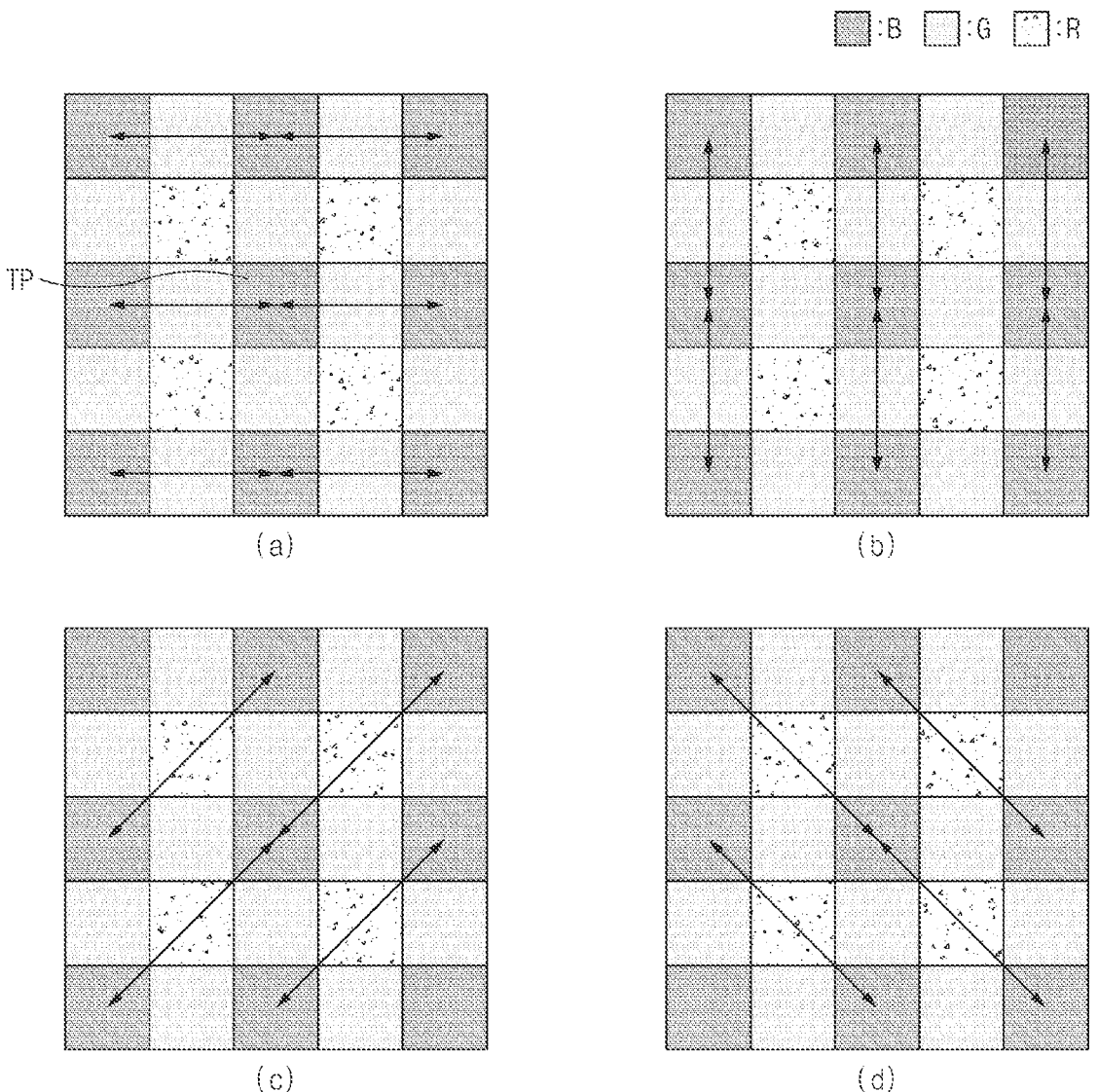
FIGS. 6 and 7 are diagrams illustrating examples of a method for calculating a gradient sum in a Bayer pattern based on some implementations of the disclosed technology.
Figure 7:
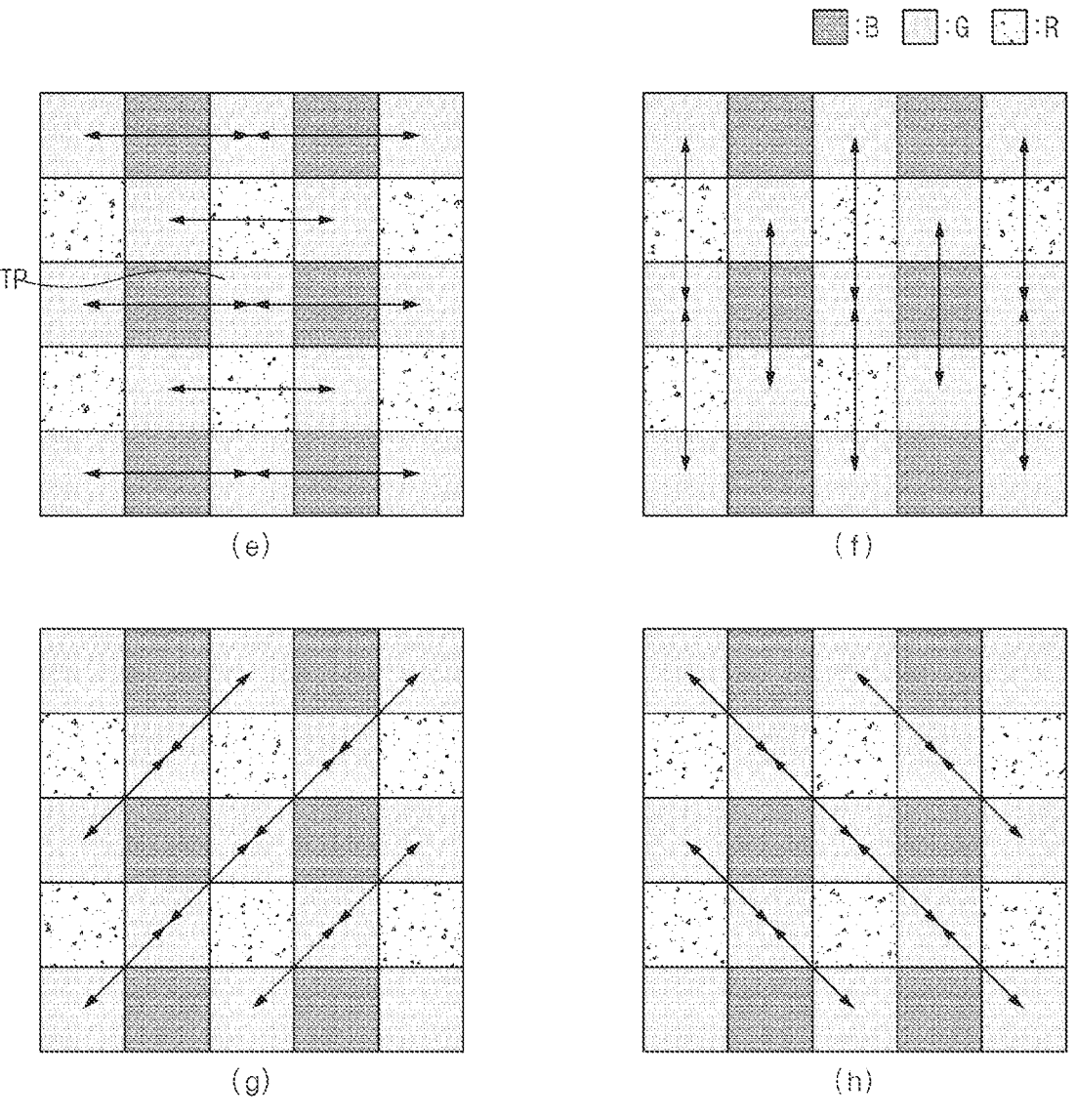

FIGS. 6 and 7 are diagrams illustrating examples of a method for calculating a gradient sum in a Bayer pattern based on some implementations of the disclosed technology.

The method of calculating the gradient sum in the Bayer pattern may be broadly divided into the pattern of FIG. 6 and the pattern of FIG. 7 according to the types of the center pixel.

FIG. 6 shows a pattern in which the target pixel TP located at the center of the kernel is a blue pixel (B), green pixels (G) are disposed adjacent to each other in up, down, left, and right directions of the target pixel TP, and four blue pixels (R) are disposed in a diagonal direction adjacent to the center blue pixel (B). That is, FIG. 6 shows an example case in which the center pixel is a blue pixel (B).

FIG. 7 shows a pattern in which the target pixel TP located at the center of the kernel is a green pixel (G), red pixels (R) are disposed adjacent to each other in up and down directions of the target pixel TP, blue pixels (B) are disposed adjacent to each other in left and right directions of the target pixel TP, and four green pixels (G) are disposed in a diagonal direction adjacent to the target pixel TP. That is, FIG. 7 shows an example case in which the center pixel is a green pixel (G).

The directionality strength determiner 213 may calculate a gradient sum in a corresponding direction within the target kernel. The directionality strength determiner 213 may determine that the directionality strength of the corresponding direction increases as the gradient sum decreases.

A method for determining basic in-kernel directionality may determine whether a texture exists in horizontal, vertical, and diagonal (slash and backslash) directions with respect to the entire target kernel. Here, the texture may refer to a set of pixels having similarity. For example, a subject having a unified color included in a captured scene may be recognized as a texture. However, it is impossible for such directionality determination to provide accurate information in a high-frequency region rather than a straight texture. Particularly, such directionality determination cannot provide accurate information in a bent or discontinuous texture pattern within a kernel, for example, in any of an edge texture that is cut in the middle, a texture boundary, and the like. For example, if directionality determination is performed for a kernel formed with straight edges meeting at square "¬"-shaped corners, it is easy for such directionality to correspond to a backslash direction ('\'). Thus, if there is a target pixel (TP) at a bent position of the texture, the result of correcting the target pixel (TP) can easily remove the bent texture. As a result, the embodiment of the disclosed technology can determine the directionality using the half direction in the kernel. In FIGS. 6 and 7, both ends of each arrow may mean a difference between two pixel values.

As can be seen from the example of FIG. 6, the directionality strength determiner 213 may obtain a gradient sum in four directions (i.e., four directions composed of a horizontal direction (a), a vertical direction (b), a slash (diagonal positive slope) direction (c), and a backslash (diagonal negative slope) direction (d)). As can be seen from the example of FIG. 7, the directionality strength determiner 213 may obtain a gradient sum in four directions (i.e., four directions composed of a horizontal direction (e), a vertical direction (f), a slash direction (g), and a backslash direction (h)).

As shown in (a) and (e) of FIGS. 6 and 7, the directionality strength determiner 213 may calculate a gradient sum corresponding to the horizontal direction. In other words, the directionality strength determiner 213 may calculate a gradient sum of the horizontal direction by summing differences between pixel data values of pixels arranged in the horizontal direction.

As shown in (b) and (f) of FIGS. 6 and 7, the directionality strength determiner 213 may calculate a gradient sum corresponding to the vertical direction. In other words, the directionality strength determiner 213 may calculate a gradient sum of the vertical direction by summing differences between pixel data values of pixels arranged in the vertical direction.

As shown in (c) and (g) of FIGS. 6 and 7, the directionality strength determiner 213 may calculate a gradient sum corresponding to the slash or positive slope direction ('/'). In other words, the directionality strength determiner 213 may calculate a gradient sum of the slash direction by summing differences between pixel data values of pixels arranged in the slash direction.

As shown in (d) and (h) of FIGS. 6 and 7, the directionality strength determiner 213 may calculate a gradient sum corresponding to the backslash or negative slope direction ('\'). In other words, the directionality strength determiner 213 may calculate a gradient sum of the backslash direction by summing differences between pixel data values of pixels arranged in the backslash direction.

In some implementations of the disclosed technology, the directionality strength determiner 213 may determine that the directionality strength in the corresponding direction increases as the value of a gradient sum in each of four directions (i.e., horizontal, vertical, slash, and backslash directions) decreases, such that the directionality strength determiner 213 can determine the directionality strength of the corresponding direction.

Hereinafter, a method for determining whether the directionality of the target kernel is unclear (ambiguous) based on the directionality strength by the clarity determiner 215, and examples of this method will be described in detail.

The clarity determiner 215 may determine whether the directionality of the target kernel is unclear (ambiguous) based on an angle between directions in the target kernel and a difference in directionality strength between the directions in the target kernel. In some implementations of the disclosed technology, two directions having high directionality strength from among directions in the target kernel may first be decided. Thereafter, if the angle between two decided directions is 45 degrees and a difference in directionality strength between the two directions is less than a threshold, this means that the directionality of the target kernel is unclear (ambiguous). Here, the threshold may be a preset value, or may be determined to be a predetermined ratio with respect to an average luminance (brightness) value of pixels in the target kernel.

For example, as a result of calculating the gradient sum for the four directions in FIG. 7, it is assumed that the gradient sum in the horizontal direction (e) is 3, the gradient sum in the vertical direction (f) is 7, the gradient sum in the slash direction (g) is 10, the gradient sum in the backslash direction (h) is 15, and the preset threshold is 5. Among the above-described four directions (e, f, g, h), two directions having higher directionality strength may be the horizontal direction (e) and the vertical direction (f). This is because the directionality strength gradually increases in descending numerical order of the gradient sums. In this case, because an angle between the horizontal direction (e) and the vertical direction (f) is 90 degrees, it is impossible to satisfy the ambiguity condition of 45 degrees. Therefore, in this case, the directionality of the target kernel may be determined to be clear, and the directionality may be in the horizontal direction €. Because the directionality of the target kernel is clear in the horizontal direction (e), the pixel corrector 220 may correct the target pixel based on such directionality.

As another example, as a result of calculating the gradient sum for the four directions in FIG. 7, it is assumed that the gradient sum in the horizontal direction (e) is 3, the gradient sum in the vertical direction (f) is 10, the gradient sum in the slash direction (g) is 7, the gradient sum in the backslash direction (h) is 15, and the preset threshold is 5. Among the above-described four directions (e, f, g, h), two directions having higher directionality strength may be the horizontal direction (e) and the slash direction (g). This is because the directionality strength gradually increases in descending numerical order of the gradient sums. In this case, because an angle between the horizontal direction (e) and the slash direction (g) is 45 degrees, it is impossible to satisfy the ambiguity condition.

As described above, the embodiment of the disclosed technology, even when the directionality of the target kernel is unclear (i.e., ambiguous), can correct the target pixel in consideration of such directionality. That is, the embodiment of the disclosed technology can correct the target pixel using the neighboring pixels (i.e., homogeneous pixels) having the same color as the target pixel from among pixels arranged in two directions (i.e., the horizontal direction (e) and the slash direction (g)) satisfying the ambiguity condition.

Figure 8:
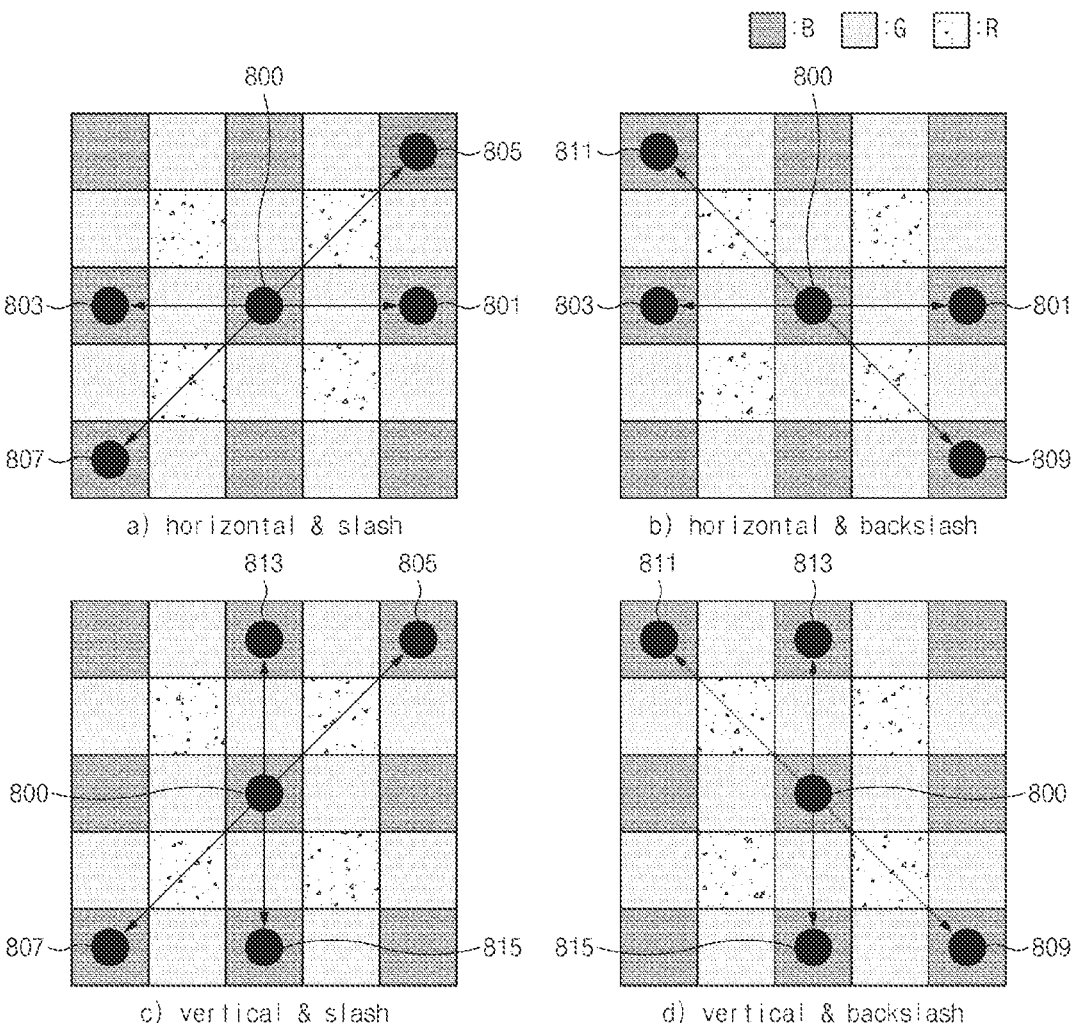
FIG. 8 is a diagram illustrating examples of a method for correcting a target pixel in some cases satisfying an ambiguity condition based on some implementations of the disclosed technology.

FIG. 8 is a diagram illustrating examples of a method for correcting a target pixel in some cases satisfying an ambiguity condition based on some implementations of the disclosed technology. As can be seen from FIG. 8, an example case in which the target pixel (TP) is a blue pixel (B) will be described as an example.

FIG. 8(*a*) illustrates an example case in which directions satisfying the ambiguity condition are a horizontal direction and a slash direction, FIG. 8(*b*) illustrates an example case in which directions satisfying the ambiguity condition are a horizontal direction and a backslash direction, FIG. 8(*c*) illustrates an example case in which directions satisfying the ambiguity condition are a vertical direction and a slash direction, and FIG. 8(*d*) illustrates an example case in which directions satisfying the ambiguity condition are a vertical direction and a backslash direction.

In FIG. 8(*a*), the target pixel 800 can be corrected not only using pixels (801, 803) having the same color as the target pixel 800 from among pixels arranged in the horizontal direction, but also using pixels (805, 807) having the same color as the target pixel 800 from among pixels arranged in the slash direction.

In FIG. 8(*b*), the target pixel 800 can be corrected not only using pixels (801, 803) having the same color as the target pixel 800 from among pixels arranged in the horizontal direction, but also using pixels (809, 811) having the same color as the target pixel 800 from among pixels arranged in the backslash direction.

In FIG. 8(*c*), the target pixel 800 can be corrected not only using pixels (813, 815) having the same color as the target pixel 800 from among pixels arranged in the vertical direction, but also using pixels (805, 807) having the same color as the target pixel 800 from among pixels arranged in the slash direction.

In FIG. 8(*d*), the target pixel 800 can be corrected not only using pixels (813, 815) having the same color as the target pixel 800 from among pixels arranged in the vertical direction, but also using pixels (809, 811) having the same color as the target pixel 800 from among pixels arranged in the backslash direction.

In some cases where the ambiguity condition is satisfied as shown in the example of FIG. 8, when pixels to be used for correction of the target pixel are determined, the pixel corrector 220 may correct the target pixel using various methods.

In some implementations, when the pixels to be used for such correction are determined, the pixel corrector 220 may correct a target pixel using an average value of the corresponding pixels. For example, an average value of pixel values of four pixels (801, 803, 805, 807) to be used for such correction as shown in FIG. 8(*a*) may be determined to be a correction value of a target pixel.

In some other implementations, when pixels to be used for correction are determined, the pixel corrector 220 may correct a target pixel using a median value of the corresponding pixels. For example, a median value of a maximum pixel value and a minimum pixel value from among pixel values of four pixels (801, 803, 805, 807) to be used for such correction as shown in FIG. 8(*a*) may be determined to be a correction value of the target pixel.

In some other implementations, when pixels to be used for correction are determined, the pixel corrector 220 may correct the target pixel using median values for each direction of the corresponding pixels and/or average values for each direction of the corresponding pixels. For example, a median value of an average value of pixel values of the horizontal pixels (801, 803) to be used for correction in FIG. 8(*a*) and an average value of pixel values of the slash-directional pixels (805, 807) may be determined to be a correction value of the target pixel. As another example, a median value of pixel values of the horizontal pixels (801, 803) to be used for correction in FIG. 8(*a*), an average value of median values of pixel values of the slash-directional pixels (805, 807), or the median values of pixel values of the slash-directional pixels (805, 807) may be determined to be a correction value of the target pixel.

In some other implementations, when pixels to be used for correction are determined, an average value or a median value of two pixels located closest to a pixel value of the target pixel from among pixel values of the determined pixels may be determined to be a correction value of the target pixel by the pixel corrector 220. For example, when the target pixel is a phase difference detection pixel, a median value or an average value of two pixels each having a pixel value closest to a pixel value of the phase difference detection pixel may be determined to be a correction value of the phase difference detection pixel by the pixel corrector 220.

According to the above-described embodiments of the disclosed technology, when the directionality of a pixel region (e.g., a kernel) including defective pixel(s) is determined to correspond to the ambiguity condition, the process for determining the directionality of the pixel region is not continued, thereby accelerating image signal processing. In addition, even when the directionality of the corresponding region is unclear (ambiguous), the embodiments of the disclosed technology can correct the defective pixel(s) in consideration of such directionality, thereby increasing the quality of image signal processing.

As is apparent from the above description, even when a kernel including defective pixel(s) has unclear directionality, the image signal processor based on some implementations of the disclosed technology can increase the accuracy of correction by correcting the defective pixels in consideration of the directionality of the corresponding kernel, thereby increasing the quality of image signal processing.

In addition, the image signal processor based on some implementations of the disclosed technology may define a condition in which the directionality of the kernel including the defective pixels is clear, and may mitigate or prevent unnecessary calculation (or unnecessary operation) from being continuously performed to determine the directionality of the target kernel in a situation where the directionality of the kernel is unclear.

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document.

Figure 9:
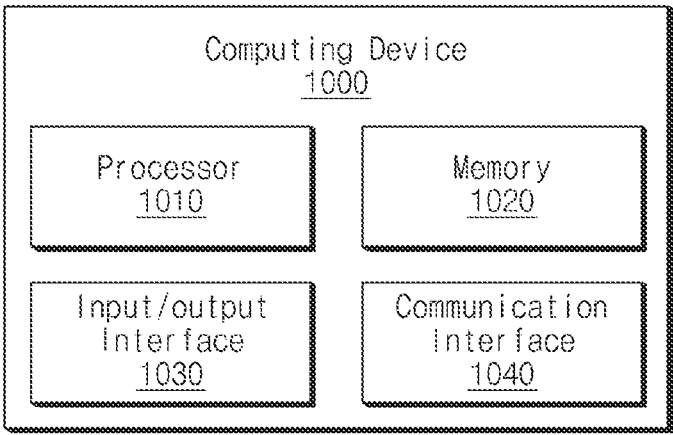
FIG. 9 is a block diagram showing an example of a computing device corresponding to the image signal processor of FIG. 1.

FIG. 9 is a block diagram showing an example of a computing device 1000 corresponding to the image signal processor of FIG. 1.

Referring to FIG. 9, the computing device 1000 may represent an embodiment of a hardware configuration for performing the operation of the image signal processor 100 of FIG. 1.

The computing device 1000 may be mounted on a chip that is independent from the chip on which the image sensing device is mounted. According to one embodiment, the chip on which the image sensing device is mounted and the chip on which the computing device 1000 is mounted may be implemented in one package, for example, a multi-chip package (MCP), but the scope of the present invention is limited thereto.

Additionally, the internal configuration or arrangement of the image sensing device and the image signal processor 100 described in FIG. 1 may vary depending on the embodiment. For example, at least a portion of the image sensing device may be included in the image signal processor 100. Alternatively, at least a portion of the image signal processor 100 may be included in the image sensing device. In this case, at least a portion of the image signal processor 100 may be mounted together on a chip on which the image sensing device is mounted.

The computing device 1000 may include a processor 1010, a memory 1020, an input/output interface 1030, and a communication interface 1040.

The processor 1010 may process data and/or instructions required to perform the operations of the components 150 to 200 of the image signal processor 100 described in FIG. 1.

The memory 1020 may store data and/or instructions required to perform operations of the components 150 to 200 of the image signal processor 100, and may be accessed by the processor 1010. For example, the memory 1020 may be volatile memory (e.g., Dynamic Random Access Memory (DRAM), Static Random Access Memory (SRAM), etc.) or non-volatile memory (e.g., Programmable Read Only Memory (PROM), Erasable PROM (EPROM), etc.), EEPROM (Electrically Erasable PROM), flash memory, etc.).

That is, the computer program for performing the operations of the image signal processor 100 disclosed in this document is recorded in the memory 1020 and executed and processed by the processor 1010, thereby implementing the operations of the image signal processor 100.

The input/output interface 1030 is an interface that connects an external input device (e.g., keyboard, mouse, touch panel, etc.) and/or an external output device (e.g., display) to the processor 1010 to allow data to be transmitted and received.

The communication interface 1040 is a component that can transmit and receive various data with an external device (e.g., an application processor, external memory, etc.), and may be a device that supports wired or wireless communication.

What is claimed is:

1. An image signal processor comprising:
   a directionality determination processor configured to determine directionality of a target kernel including a target pixel, based on an angle between directions within the target kernel and a difference in directionality strength between the directions; and
   a pixel correction processor configured to correct, when the target kernel has specific directionality according to a result of the directionality determination, the target pixel using pixels arranged in each of a plurality of directions having higher directionality strength than a predetermined directionality strength from among the directions within the target kernel.

2. The image signal processor according to claim 1, wherein:
   the plurality of directions includes two directions.

3. The image signal processor according to claim 2, wherein the directionality determination processor includes:

a flat region determination processor configured to determine whether the target kernel is flat;

a directionality strength determination processor configured to determine directionality strength for each direction within the target kernel when the target kernel is not flat; and a clarity determination processor configured to determine that the directionality of the target kernel is unclear when two directions having high directionality strength from among the directions within the target kernel are decided, an angle between the two decided directions is any one of a preset angle and an angle within a preset range, and a difference in directionality strength between the two decided directions is less than a threshold.

4. The image signal processor according to claim 3, wherein the flat region determination processor is configured to:

determine the target kernel to be a flat region when a dynamic range within the target kernel is less than a first reference value and a standard deviation of homogeneous pixels having a same color within the target kernel is less than a second reference value.

5. The image signal processor according to claim 3, wherein the directionality strength determination processor is configured to:

calculate a gradient sum for each direction in the target kernel; and determine that the directionality strength increases in a corresponding direction as the calculated gradient sum value decreases, wherein the gradient sum is a value obtained by summing differences between pixel values for each pair of pixels arranged in the corresponding direction.

6. The image signal processor according to claim 3, wherein:

the pixel correction processor is configured to correct the target pixel using an average value of homogeneous pixels having a same type as the target pixel while being arranged in the two directions, wherein the angle between the two directions is any one of the preset angle and an angle within the preset range, and the difference in directionality strength between the two directions is less than the threshold.

7. The image signal processor according to claim 3, wherein:

the pixel correction processor is configured to correct the target pixel using a median value of homogeneous pixels having a same type as the target pixel, wherein the angle between the two directions is any one of the preset angle and an angle within the preset range, and the difference in directionality strength between the two directions is less than the threshold.

8. The image signal processor according to claim 3, wherein:

the pixel correction processor is configured to correct the target pixel using an average value or median value of two pixel values closest to a pixel value of the target pixel, from among pixel values of homogeneous pixels having a same type as the target pixel, wherein the angle between the two directions is any one of the preset angle and an angle within the preset range, and the difference in directionality strength between the two directions is less than the threshold.

9. The image signal processor according to claim 8, wherein:

the target pixel is a phase detection autofocus (PDAF) pixel.

10. The image signal processor according to claim 3, wherein:

the threshold is determined to be a preset value or is determined to be a predetermined ratio with respect to an average luminance value of pixels in the target kernel.

11. The image signal processor according to claim 2, wherein:

the directions in the target kernel include a horizontal direction, a vertical direction, a diagonal positive-slope slash direction, and a diagonal negative-slope backslash direction with respect to the target pixel.

12. An image signal processor comprising:

a directionality determination processor configured to determine directionality of a target kernel including a target pixel; and a pixel correction processor configured to correct, when the target kernel has specific directionality according to a result of the directionality determination, the target pixel based on a plurality of directions having higher directionality strength than a predetermined directionality strength from among directions within the target kernel.

13. The image signal processor according to claim 12, wherein the directionality determination processor is configured to:

determine the directionality of the target kernel based on an angle between directions within the target kernel and a difference in directionality strength between the directions.

14. The image signal processor according to claim 13, wherein:

the directionality determination processor is configured to determine that the directionality of the target kernel is unclear when a plurality of directions having high directionality strength from among the directions within the target kernel is decided, an angle between the two decided directions is any one of a preset angle and an angle within a preset range, and a difference in directionality strength between the two decided directions is less than a threshold.

15. The image signal processor according to claim 13, further comprising:

a directionality strength determination processor configured to determine directionality strength for each direction in the target kernel by calculating a gradient sum for each direction in the target kernel.

16. The image signal processor according to claim 15, wherein the directionality strength determination processor is configured to:

determine that the directionality strength increases as a value of the gradient sum decreases.

17. The image signal processor according to claim 13, further comprising:

a flat region determination processor configured to determine whether the target kernel is flat, wherein the directionality determination processor is configured to determine the directionality of the target kernel upon determining that the target kernel is not flat.

18. The image signal processor according to claim 13, wherein the pixel correction processor is configured to:

correct the target pixel using an average value or median value of pixel values of pixels arranged in the plurality of directions having high directionality strength, or using a predetermined number of pixels each having a value close to a pixel value of the target pixel.

\* \* \* \* \*